US012305303B2

(12) United States Patent
Yuan et al.

(10) Patent No.: US 12,305,303 B2
(45) Date of Patent: May 20, 2025

(54) COMPACT HYDROGEN-OXYGEN GENERATOR

(71) Applicant: South China University of Technology, Guangzhou (CN)

(72) Inventors: Bin Yuan, Guangzhou (CN); Weiliang Peng, Guangzhou (CN); Hao Li, Guangzhou (CN); Renzong Hu, Guangzhou (CN); Yan Gao, Guangzhou (CN); Min Zhu, Guangzhou (CN)

(73) Assignee: South China University of Technology, Guangzhou (CN)

( * ) Notice: Subject to any disclaimer, the term of this patent is extended or adjusted under 35 U.S.C. 154(b) by 669 days.

(21) Appl. No.: 17/639,066

(22) PCT Filed: Oct. 15, 2020

(86) PCT No.: PCT/CN2020/121125
§ 371 (c)(1),
(2) Date: Feb. 28, 2022

(87) PCT Pub. No.: WO2021/135505
PCT Pub. Date: Jul. 8, 2021

(65) Prior Publication Data

US 2022/0298654 A1 Sep. 22, 2022

(30) Foreign Application Priority Data

Dec. 31, 2019 (CN) ........................ 201911408794.4

(51) Int. Cl.
*C25B 9/17* (2021.01)
*C25B 1/04* (2021.01)
(Continued)

(52) U.S. Cl.
CPC .................. *C25B 9/17* (2021.01); *C25B 1/04* (2013.01); *C25B 1/044* (2021.01); *C25B 11/031* (2021.01);
(Continued)

(58) Field of Classification Search
CPC ......... C25B 1/04; C25B 1/044; C25B 11/046; F02B 43/10; F02B 2043/106
See application file for complete search history.

(56) References Cited

U.S. PATENT DOCUMENTS

2011/0209993 A1* 9/2011 Barmichael ............ F02M 25/12 204/267
2019/0010621 A1 1/2019 Bogers et al.

FOREIGN PATENT DOCUMENTS

CN 101949341 A 1/2011
CN 102623712 A 8/2012
(Continued)

OTHER PUBLICATIONS

International Search Report dated Jan. 14, 2021, Application No. PCT/CN2020/121125.

*Primary Examiner* — Ciel P Contreras
(74) *Attorney, Agent, or Firm* — The Dobrusin Law Firm, PC

(57) ABSTRACT

The present invention discloses a compact vehicle-mounted hydrogen-oxygen generator. In the fluid path, the water circulation outlet of the water tank is in communication via one of the two one-way throttle valves with the water pump, which is in communication with the electrolytic tank of the hydrogen-oxygen generator, which is in communication with the water circulation inlet of the water tank through the other one-way throttle valve, and the gas outlet of the water tank is in communication with an engine air-inlet via the steam-water separator and the dry flame arrester in turn. In the circuit, the water pump and the electrolytic tank of the hydrogen-oxygen generator are connected in parallel to the ends of the positive and negative electrodes of the vehicle power supply, respectively; the switch, the fuse and the electrolytic tank of the hydrogen-oxygen generator are connected in series to the vehicle power supply. The present invention realizes high-efficiency electrolysis through a porous electrode rod with high specific surface area, high catalytic activity, high electrical conductivity and high surface energy (being hydrophilic and air-repellent), as well as
(Continued)

the compact design of tightly nested stainless steel sleeves; on the premise of meeting the gas production requirements, the present invention reduces the volume and weight of the electrolytic tank; the present invention realizes the single electrolytic chamber assembly of the vehicle-mounted hydrogen-oxygen generator, and allows direct connection to a single sealed electrolytic chamber in the circuit and the fluid path, effectively avoiding the problem with the serial connection of multiple electrolytic chambers.

10 Claims, 8 Drawing Sheets

(51) Int. Cl.

*C25B 1/044* (2021.01)
*C25B 11/031* (2021.01)
*C25B 11/046* (2021.01)
*C25B 15/023* (2021.01)
*F02M 25/12* (2006.01)

(52) U.S. Cl.

CPC .......... *C25B 11/046* (2021.01); *C25B 15/023* (2021.01); *F02M 25/12* (2013.01)

(56) References Cited

FOREIGN PATENT DOCUMENTS

| | | | |
|---|---|---|---|
| CN | 203296968 | U | 11/2013 |
| CN | 204024863 | U | 12/2014 |
| CN | 106848192 | A | 6/2017 |
| CN | 109944717 | A | 6/2019 |
| CN | 109972158 | A | 7/2019 |
| CN | 209083405 | U | 7/2019 |
| CN | 209354269 | U | 9/2019 |
| CN | 111075612 | A | 4/2020 |
| JP | 2003073872 | A | 3/2003 |

* cited by examiner

COMPACT HYDROGEN-OXYGEN GENERATOR

FIELD OF THE INVENTION

The present invention relates to an alkaline water electrolysis device, in particular to a compact hydrogen-oxygen generator.

BACKGROUND OF THE INVENTION

With the development of automobile industry, China's vehicle ownership and production are both showing a fast rising trend. Relevant data show that the number of civilian vehicles in China has reached 232 million. Most of these vehicles use fossil fuels such as petroleum or natural gas as their driving energy; however, the burning of petroleum as a fossil fuel will inevitably bring about two major problems, i.e. energy crisis and environmental pollution. Although the existing conventional petroleum resources are only sufficient for human use for about 40 years, with the continuous improvement of petroleum resource exploration and exploitation technologies, some unconventional petroleums such as shale oil and tight oil have been found to be rich in reserves and sufficient for human use for about 4000 years. Therefore, the energy crisis seems to be just a false proposition, and the biggest problem with the use of fossil fuels is still environmental pollution. Environmental pollution is mainly caused by insufficient fuel combustion of automobile internal combustion engines; at present, the combustion efficiency of automobile internal combustion engines is 40% to 60%. Automobile exhaust, mainly comprising CO, $NO_x$ and HC, has become the main source of air pollution in China.

In order to completely solve the problem of environmental pollution, people have also developed many new energy vehicles (including lithium battery pure electric vehicles and hydrogen fuel cell vehicles). However, with the development of new energy vehicles, there are still many key issues that have not been well resolved, such as high production and maintenance costs, poor safety, low energy density, and short endurance mileage. Moreover, new energy vehicles only account for 0.7% of the national vehicle ownership. Therefore, in order to solve the existing air pollution problem, the exhaust emission of existing fuel vehicles must be reduced. Studies have found that hydrogen has the characteristics of low minimum ignition energy (⅓ of that of gasoline) and fast flame propagation speed (7.7 times of that of gasoline); accordingly, introducing hydrogen into the internal combustion engine to burn together with gasoline and other fossil fuels can effectively improve the combustion efficiency of the internal combustion engine (by up to 70% to 90%), reducing pollutant emission significantly, decreasing fuel consumption and increasing power.

Using a vehicle-mounted hydrogen-oxygen generator to generate a hydrogen-oxygen mixture gas in real time so as to introduce the mixture gas into the engine for combustion with gasoline can effectively solve the problems with hydrogen production and storage in the hydrogenation combustion of fuel engines, having the characteristics of high safety and simple equipment. At present, the electrolysis methods of the vehicle-mounted hydrogen-oxygen generator are usually divided into two types, namely SPE electrolysis and alkaline water electrolysis. For the SPE electrolysis process, the related ion exchange membrane technology is monopolized by foreign countries, and deionized water needs to be used as the raw material of water electrolysis, which result in high manufacturing and usage costs of the SPE hydrogen-oxygen generator, not conducive to large-scale promotion. In contrast, the alkaline water electrolysis technology is relatively mature in industrial electrolysis of water for hydrogen production, and thus an ideal choice for the vehicle-mounted hydrogen-oxygen generator.

In the currently reported vehicle-mounted hydrogen-oxygen generators, there are still the following problems: (1) The size of the device is too large, which is not conducive to the adaptation of the device for the existing vehicles; (2) the amount of hydrogen and oxygen produced is small, and the effect of improving the combustion characteristics of gasoline engines is not obvious; (3) the electrolytic tank has multiple electrolytic chambers, which require multiple electrode sheets to be closely stacked, resulting in high production cost and heavy weight of the electrolytic tank, as well as large solution impedance and contact resistance during operation; and (4) the complex structure of the multiple electrolytic chambers leads to a cumbersome assembly process of the electrolytic tank and the accuracy not easy to control, which will cause nonuniform gas-liquid distribution in each electrolytic cell, large voltage difference, and easy short circuit, open circuit and liquid leakage and other faults during operation.

The root of the problems with the existing vehicle-mounted hydrogen-oxygen generator is the poor performance and unreasonable structural design of the electrode material, which makes it impossible to miniaturize the device while improving the electrolysis efficiency. Therefore, a complicated multiple-electrolytic-chamber structure has to be adopted to increase the reaction area. Studies have shown that the best electrode material for alkaline water electrolysis contains precious metal elements such as Pt, Ir and Ru; however, due to the high price and limited stock of precious metals, it is impossible to apply these precious metal elements on a large scale in vehicle-mounted hydrogen-oxygen generators at low cost. With transition metal elements containing vacant d orbitals and unpaired d electrons, when the transition metal elements are in contact with reactant molecules, various characteristic chemisorption bonds are formed on the vacant d orbitals to achieve molecular activation, thereby reducing the activation energy of the reaction system and achieving the purpose of electrocatalysis. Therefore, by using electrode materials containing transition metal elements to replace precious metals, the cost is reduced to realize industrial application.

At present, the electrode sheets commonly used in the vehicle-mounted hydrogen-oxygen generator are made of austenitic stainless steel, which reduces the manufacturing cost compared with the electrode sheets made of precious metal materials; however, austenitic stainless steel still has shortcomings such as low intrinsic catalytic activity and small specific surface area, which limit the further improvement of the performance of the vehicle-mounted hydrogen-oxygen generator.

Chinese invention patent No. 2014105648580 discloses a small portable vehicle-mounted hydrogen-oxygen generator, which comprises a plurality of electrolytic tanks, a water tank and a pump arranged in a box; each of the electrolytic tanks is connected with one oxygen distribution pipe, one hydrogen distribution pipe and one water distribution pipe; several oxygen distribution pipes collectively communicate with a main oxygen pipe, and several hydrogen distribution pipes collectively communicate with a main hydrogen pipe; a main water pipe and the water tank form a closed circulating fluid path, a plurality of water distribution pipes collectively communicate with the main water pipe, and the pump arranged on the main water pipe can drive the fluid to flow. This invention provides a more reasonable gas and water pipeline design, making the hydrogen-oxygen generator more compact in overall structure, smaller in size, and more portable; the circulation design of the water pipeline enables the gas in the electrolytic tank to be discharged in time, thereby improving the electrolysis efficiency; the water vapor in the electrolysis process is filtered out, and oxygen and hydrogen are also output from the electrolytic tank in time due to the designed structure of the gas pipeline. However, limited by the electrolysis efficiency of the electrolytic tank, this invention uses a series structure in the design of both the circuit and the fluid path to connect multiple small electrolytic tanks to work together, so as to meet the gas production requirements of the vehicle-mounted hydrogen-oxygen generator. This structural design undoubtedly increases the volume and weight of the device, and makes the assembly process of the device cumbersome. The connection of multiple small electrolytic tanks also greatly increases the solution impedance and contact resistance, reducing the energy conversion efficiency. Besides, the small precision differences between the multiple small electrolytic tanks will lead to large voltage differences between each other and nonuniform gas-liquid distribution, which is prone to short circuit, open circuit and liquid leakage during operation. In addition, the failure of a single small electrolytic tank can cause the disconnection of the entire device, thereby affecting the operation, and the existence of the multiple small electrolytic tanks also brings troubles to the troubleshooting of the device.

CONTENTS OF THE INVENTION

In order to solve the problems with the existing vehicle-mounted hydrogen-oxygen generator, the present invention aims to provide a compact vehicle-mounted hydrogen-oxygen generator. The present invention realizes high-efficiency electrolysis through a porous electrode rod with high specific surface area, high catalytic activity, high electrical conductivity and high surface energy (being hydrophilic and air-repellent), as well as the compact design of tightly nested stainless steel sleeves; on the premise of meeting the gas production requirements, the present invention reduces the volume and weight of the electrolytic tank; the present invention realizes the single electrolytic chamber assembly of the vehicle-mounted hydrogen-oxygen generator, and allows direct connection to a single sealed electrolytic chamber in the circuit and the fluid path, effectively avoiding the problem with the serial connection of multiple electrolytic chambers; besides, the present invention introduces a working characteristic detection module, which can monitor the working status of a single sealed electrolytic chamber in real time, so as to perform fault warning and status detection of the device.

The iron-based alloy of the present invention is composed of two or more elements, with large potential difference between different elements; with the $FeCl_3$+$Na_2S_2O_8$ solution as the dealloying solution, based on the characteristics of the high potential of $Fe^{3+}$ and the strong oxidation of $S_2O_8^{2-}$, the elements with lower potential in the iron-based alloy can be dissolved, so as to achieve rapid and low-cost preparation of the porous iron-based alloy. Porous iron-based alloy rods also have the characteristics of high specific surface area, high catalytic activity, high electrical conductivity and high surface energy (being hydrophilic and air-repellent), which can improve the thermodynamic and kinetic conditions in the electrolysis process, improve the electrolysis efficiency, and reduce the use of electrode materials on the premise of ensuring the gas production. In addition, through the close nesting of the austenitic stainless steel tube (cathode) and the porous iron-based alloy rod (anode) with high specific surface area, high catalytic activity, high electrical conductivity and high surface energy (being hydrophilic and air-repellent), the structure optimization of the electrolytic tank of the hydrogen-oxygen generator is achieved, greatly reducing the volume and weight of the electrolytic tank (the electrolytic tank of the present invention has the volume not exceeding 0.2 L, and the weight not exceeding 0.5 kg). Therefore, the vehicle-mounted hydrogen-oxygen generator and porous electrode material prepared by the present invention can better meet the needs of vehicle-mounted hydrogen production, have the characteristics of large gas production, small volume, simple structure, easy production and assembly, etc., and can be produced on a large scale, easy to be used in the refitting of various vehicle models. In the preparation of the porous electrode, the iron-based alloy is made porous through the dealloying treatment; by using the porous iron-based alloy as the electrode material and taking advantage of its high specific surface area, high catalytic activity, high electrical conductivity and high surface energy (being hydrophilic and air-repellent), not only the electrolytic tank of the vehicle-mounted hydrogen-oxygen generator is miniaturized and simplified, but the gas production is ensured as well.

The object of the present invention is achieved through the following technical solution:

A compact vehicle-mounted hydrogen-oxygen generator is provided, comprising a box, a water tank, an electrolytic tank of the hydrogen-oxygen generator, a water pump, a working characteristic detection module, a fuse, a switch, a steam-water separator, a dry flame arrester and two one-way throttle valves;

the water tank is provided on the top with a liquid injection port, and on the side with a water circulation outlet, a water circulation inlet and a gas outlet;

in the fluid path, the water circulation outlet of the water tank is in communication via one of the two one-way throttle valves with the water pump, which is in communication with the electrolytic tank of the hydrogen-oxygen generator, which is in communication with the water circulation inlet of the water tank through the other one-way throttle valve, and the gas outlet of the water tank is in communication with an engine air-inlet via the steam-water separator and the dry flame arrester in turn;

in the circuit, the water pump and the electrolytic tank of the hydrogen-oxygen generator are connected in parallel to the ends of the positive and negative electrodes of the vehicle power supply, respectively; the switch, the fuse and the electrolytic tank of the hydrogen-oxygen generator are connected in series to the vehicle power supply; with the working characteristic detection module having five terminals in total, the first terminal is connected to the negative electrode of the electrolytic tank of the hydrogen-oxygen generator, the second terminal is connected to the negative electrode of the power supply, the third terminal is connected to the positive electrode of the electrolytic tank of the hydrogen-oxygen generator, the fourth terminal is suspended and not connected, and the fifth terminal is connected to the positive electrode of the power supply;

in the electrolytic tank of the hydrogen-oxygen generator, a sealed electrolytic chamber is formed by an upper cover plate, a stainless steel sleeve and a lower cover plate, and is provided inside with a stainless steel tube as a cathode and a porous electrode rod as an anode; the porous electrode rod passes through the upper cover plate to serve as a positive electrode terminal, and the limit bolt connected to the stainless steel tube passes through the lower cover plate to serve as a negative electrode terminal; the upper cover plate and the lower cover plate are respectively provided with a water inlet and a water outlet to connect to the sealed electrolytic chamber;

The porous electrode rod is prepared through the following steps:

1) Dissolving $FeCl_3 \cdot 6H_2O$ and $Na_2S_2O_8$ in deionized water, and stirring to obtain solution A;
2) selecting iron-based alloy (containing 40% to 60% by mass of nickel, less than 0.03% by mass of S, and less than 0.03% by mass of P, with iron for the balance), and fully polishing its surface to remove the surface oxide scale;
3) adding the polished iron-based alloy obtained in step 2) to solution A, and reacting while stirring; and
4) taking out the iron-based alloy after the reaction, and washing and drying it.

To further achieve the object of the present invention, preferably, the diameter of the porous electrode rod as the anode is 8-11.5 mm.

Preferably, the stainless steel tube is a 304 stainless steel tube with an inner diameter of 12-14 mm and an outer diameter of 14-16 mm.

Preferably, in step 1), the mass ratio of $Na_2S_2O_8$, $FeCl_3 \cdot 6H_2O$ and water is (2 to 4):(5 to 7):25, and the stirring is done magnetically at a rotating speed of 50-150 rpm for 5-10 min.

Preferably, 180-360 mesh SiC sandpaper is used for polishing in step 2), with the polishing time of 5-15 min.

Preferably, the stirring in step 3) is done magnetically at a rotating speed of 50-150 rpm for 2-12 h; and in step 4), the washing is done by washing with water and ethanol for 3-5 times, respectively, and the drying is done by drying in an oven for 0.5-2 h at the temperature of 40° C. to 80° C.

Preferably, the upper cover plate is provided at the center of the lower surface with an upper circular groove, and the lower cover plate is provided at the center of the upper surface with a lower circular groove, with a stainless steel sleeve embedded between the upper circular groove and the lower circular groove; the porous electrode rod has its top threaded through the threaded through hole of the upper cover plate, and its bottom embedded in the small groove of the lower cover plate, so as to get fastened; and the stainless steel tube is respectively embedded into the upper large groove of the upper cover plate and the lower large groove of the lower cover plate, so as to get fastened.

Preferably, the upper cover plate is provided in the upper circular groove with an upper large groove, which is provided inside with a threaded through hole; a water inlet is arranged between the upper circular groove and the upper large groove; the lower cover plate is provided in the lower circular groove with a lower large groove, which is provided inside with a small groove, with a water outlet and a threaded through hole arranged between the lower circular groove and the lower large groove; the porous electrode rod has its top threaded through the threaded through hole of the upper cover plate, and its bottom embedded in the small groove of the lower cover plate, so as to get fastened; the stainless steel tube is respectively embedded into the upper large groove of the upper cover plate and the lower large groove of the lower cover plate, so as to get fastened; a limit bolt passes through a conductive plate in connection with the stainless steel tube of the cathode material, and then passes through the threaded through hole of the lower cover plate to fit with a nut to serve as the negative electrode terminal of the electrolytic tank; the water inlet pipe joint is embedded in the water inlet of the upper cover plate, and the water outlet pipe joint is embedded in the water outlet of the lower cover plate.

Preferably, the electrolyte (0.03-0.5 M caustic potassium solution) flows into the compact sealed electrolytic chamber through the water inlet, and the generated hydrogen-oxygen mixture gas quickly flows out of the water outlet together with the electrolyte.

Preferably, the upper cover plate and the lower cover plate are fastened through four limit bolts.

The present invention has the following advantages and excellent effects relative to the prior art:

(1) The present invention uses a simple one-step dealloying method to prepare a porous iron-based alloy as the porous electrode, whose surface has micron-scale three-dimensional pores in communication with each other; besides, there are many nano-scale steps on the micron-scale pore wall; the pores of this micro-nano structure greatly increase the specific surface area of the electrode and expose more active sites, improving the thermodynamic and kinetic conditions in the electrolysis process;

(2) because the porous iron-based alloy has excellent electrolytic catalytic performance, the present invention uses the porous iron-based alloy rod as the positive electrode material of the electrolytic tank of the hydrogen-oxygen generator, thereby greatly reducing the use area and quantity of the electrode material; in addition, the present invention uses the 304 stainless steel tube as the cathode material, with the 304 stainless steel tube closely nested with the porous iron-based alloy rod; by optimizing the electrode material and electrolytic tank structure, the present invention reduces the volume and weight of the hydrogen-oxygen generator;

(3) with the porous iron-based alloy electrode rod prepared by the present invention having a porous surface and a dense core, the dense core can provide a fast electron transfer channel for the porous layer on the surface and improve the electrical conductivity of the porous iron-based alloy electrode, thereby effectively reducing the contact impedance of the hydrogen-oxygen generator;

(4) the porous iron-based alloy electrode rod prepared by the present invention has the characteristics of high surface energy, and the surface micro-nano pores destroy the continuous gas-liquid-solid three-phase contact line, so that the surface exhibits hydrophilic and gas-repellent characteristics, thereby promoting the mass transfer process and gas diffusion during electrolysis while realizing the compact design of the hydrogen-oxygen generator, improving the electrolysis efficiency.

(5) the vehicle-mounted hydrogen-oxygen generator and porous electrode material prepared by the present invention, while meeting the needs of vehicle-mounted hydrogen production, can have the characteristics of small volume, simple structure, easy production and assembly, etc., and can be produced on a large scale.

DETAILED DESCRIPTION OF THE EMBODIMENTS

Figure 1:
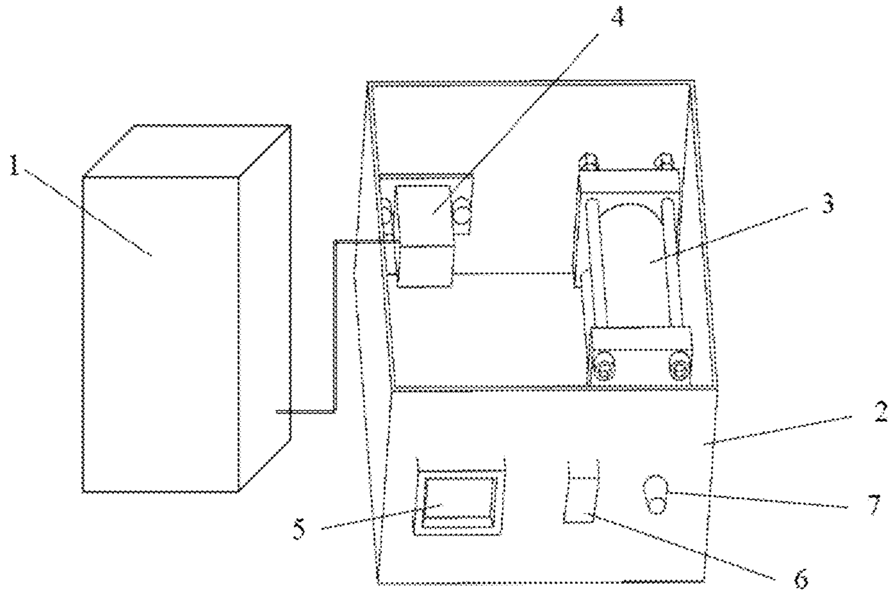
FIG. 1 is a schematic structural diagram of the compact vehicle-mounted hydrogen-oxygen generator of the present invention.

In order to better understand the technical solution of the present invention, the present invention will be described in more detail below in conjunction with examples and drawings, but the embodiments of the present invention are not limited thereto.

A compact vehicle-mounted hydrogen-oxygen generator is shown in FIGS. 1-4, comprising a water tank 1, a box 2, an electrolytic tank 3 of the hydrogen-oxygen generator, a water pump 4, a working characteristic detection module 5, a switch 6, a fuse 7, a one-way throttle valve 8, a steam-water separator 9 and a dry flame arrester 10; the water tank 1 is arranged outside the box 2, which is made of aluminum alloy with high strength, light weight and good thermal conductivity; the electrolytic tank 3 of the hydrogen-oxygen generator and the water pump 4 are fastened in the box 2 by limit bolts, and the working characteristic detection module 5, the switch 6 and the fuse 7 are embedded in the box 2 by clamping.

Figure 2:
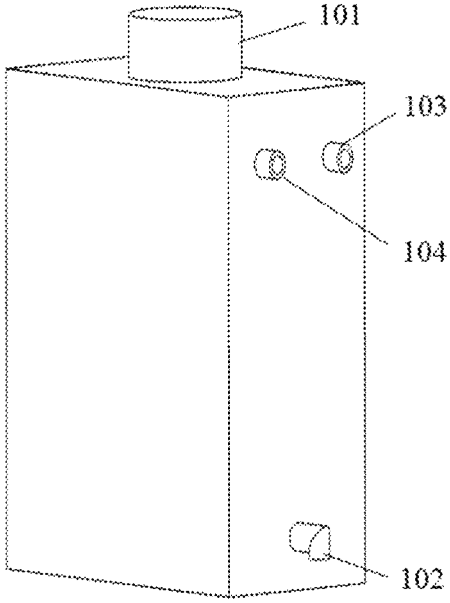
FIG. 2 is an outline view of the water tank in the compact vehicle-mounted hydrogen-oxygen generator of the present invention.
Figure 3:
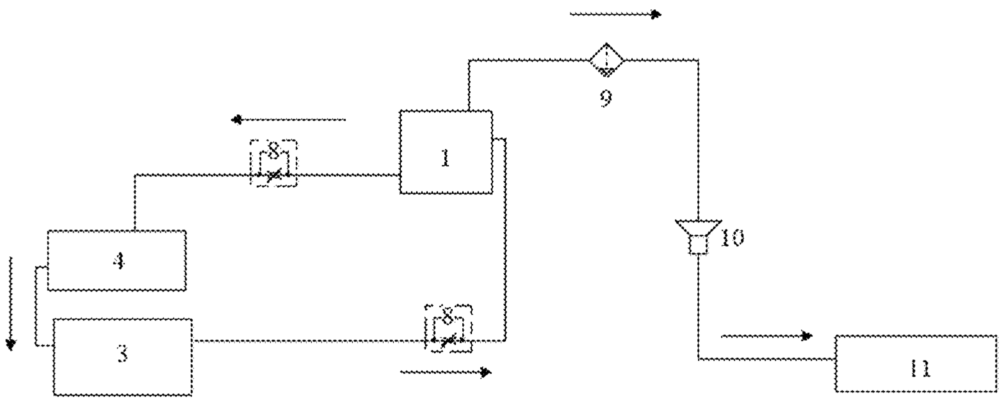
FIG. 3 is a schematic diagram of gas-liquid flow of the compact vehicle-mounted hydrogen-oxygen generator of the present invention in operation.
Figure 4:
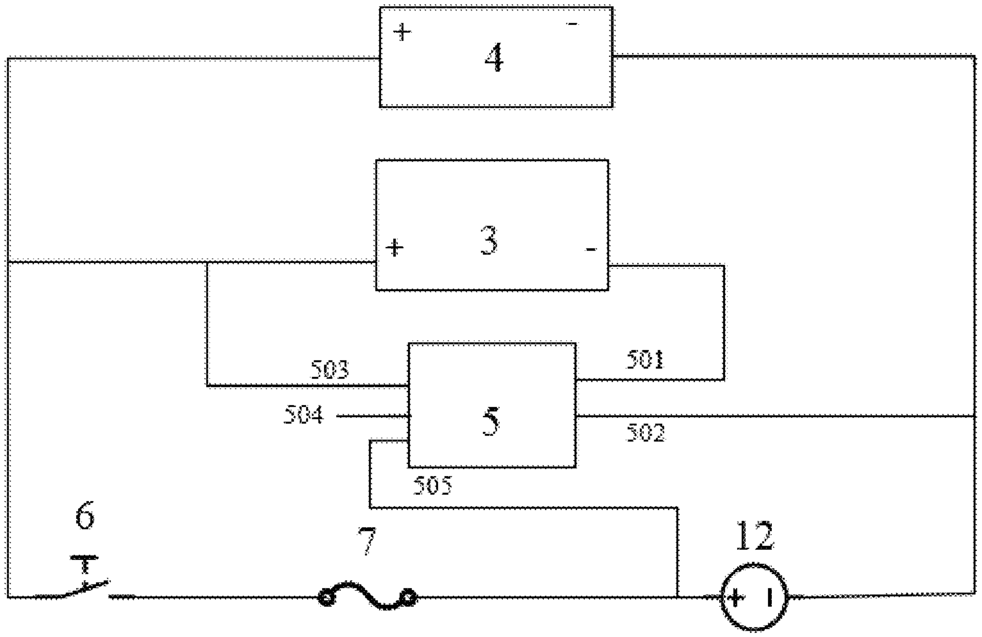
FIG. 4 is a schematic diagram of circuit connection of the compact vehicle-mounted hydrogen-oxygen generator of the present invention in operation.
Figure 5:
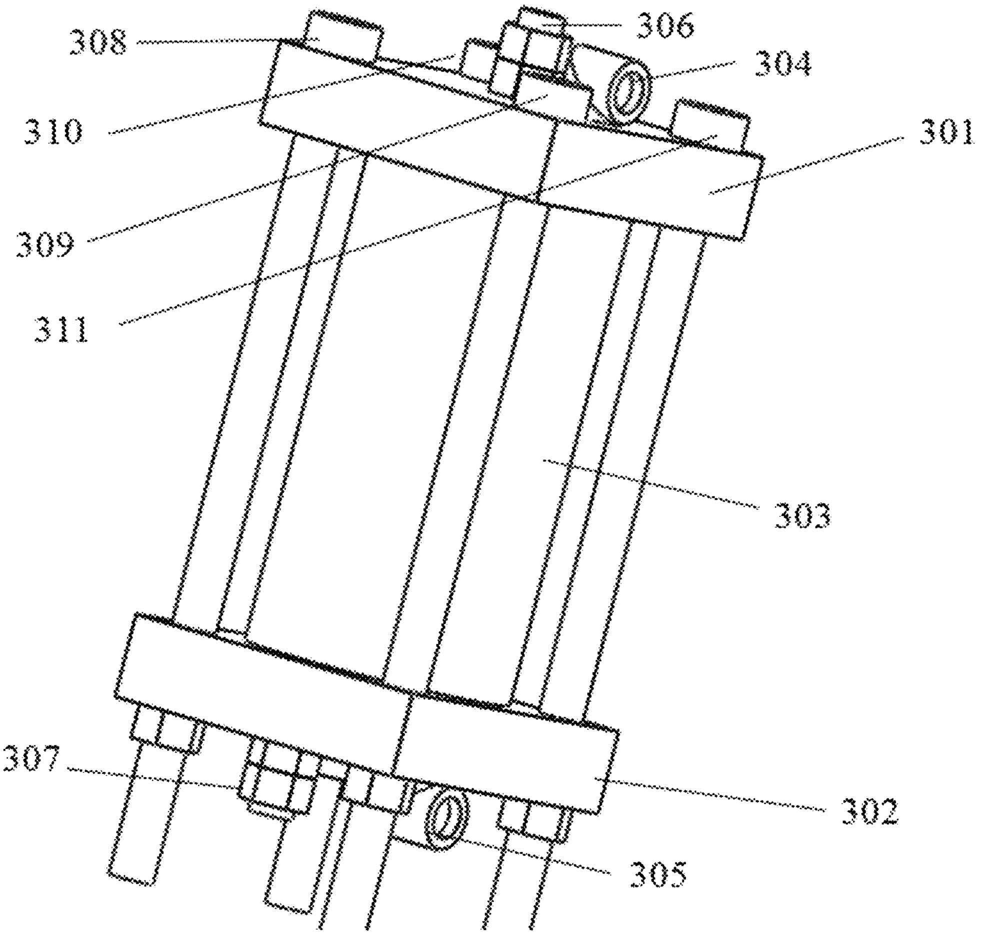
FIG. 5 is a three-dimensional structural diagram of the electrolytic tank of the present invention.
Figure 6:
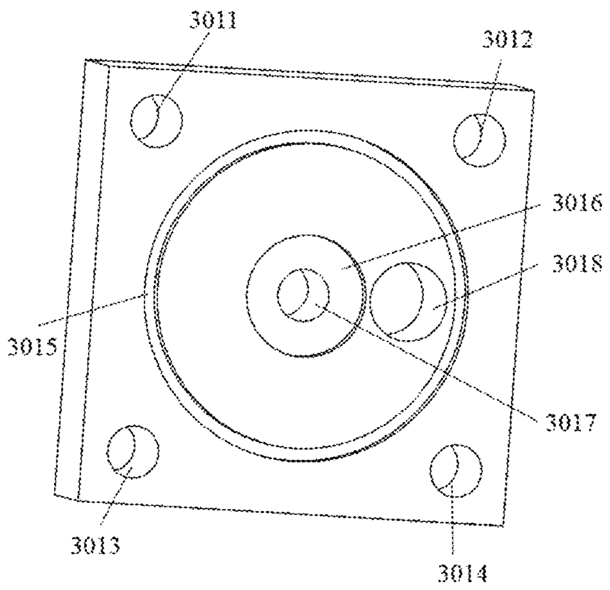
FIG. 6 is a three-dimensional structural diagram of the upper cover plate of the electrolytic tank of the present invention.
Figure 7:
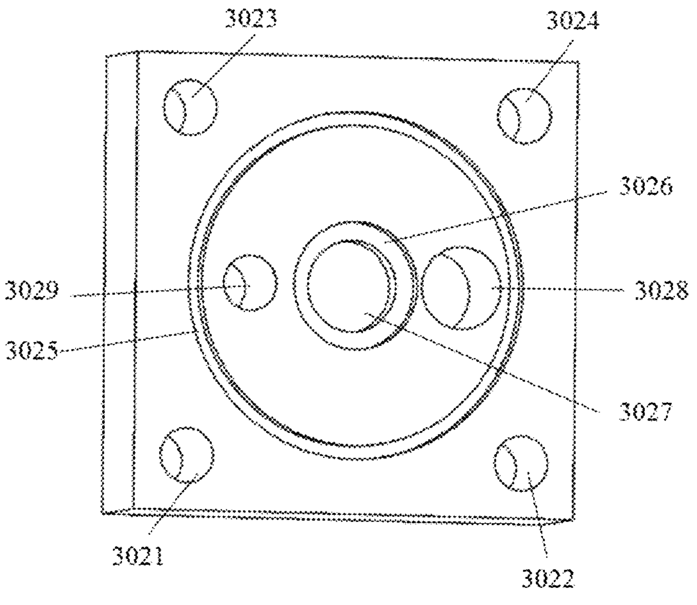
FIG. 7 is a three-dimensional structural diagram of the lower cover plate of the electrolytic tank of the present invention.
Figure 8:
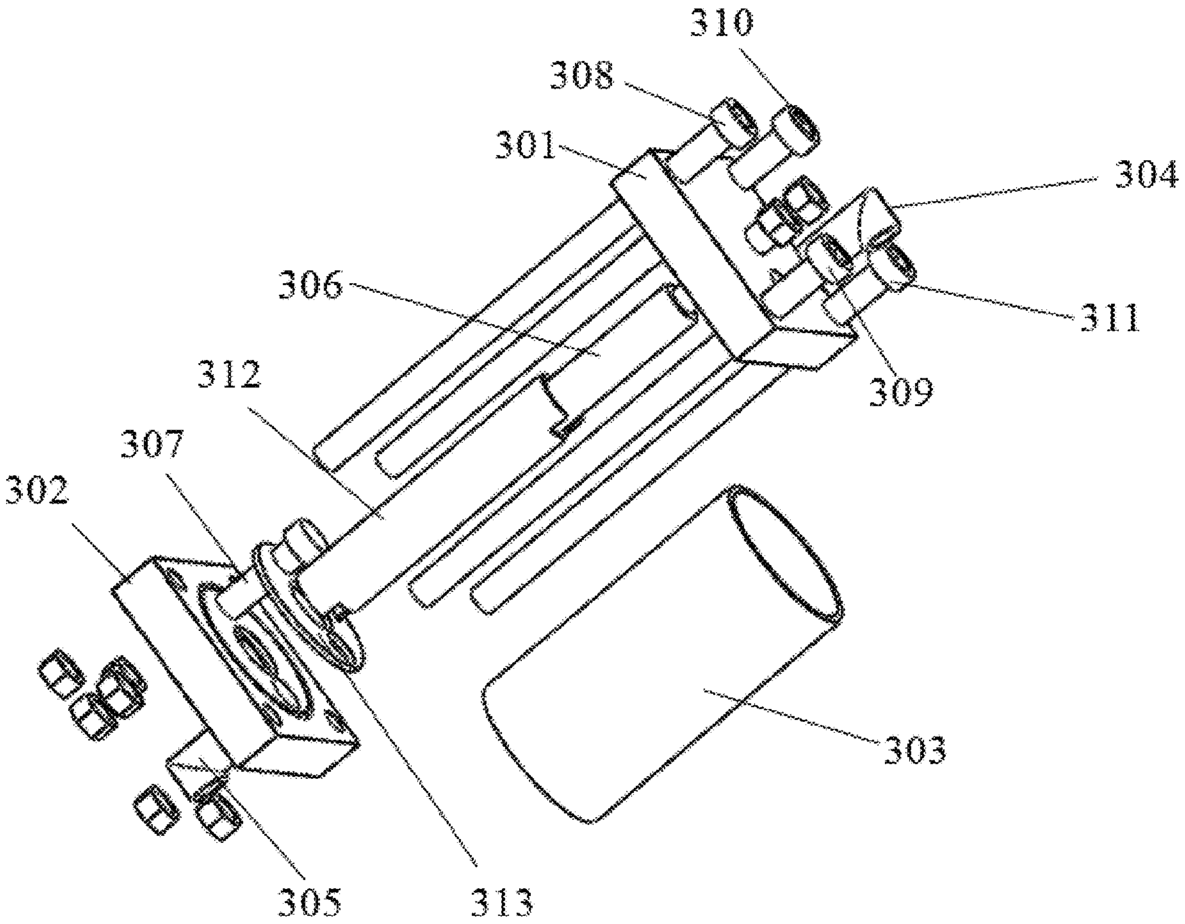
FIG. 8 is an exploded view of the electrolytic tank of the present invention.

As shown in FIG. 2, the water tank 1 is provided with a liquid injection port 101, a water circulation outlet 102, a water circulation inlet 103, and a gas outlet 104; when the device is in operation, the water tank 1 is filled with 0.1M caustic potassium solution as the electrolyte through the liquid injection port 101.

In the fluid path, the water circulation outlet 102 of the water tank 1 is in communication via one of the two one-way throttle valves 8 with the water pump 4, which is in communication with the electrolytic tank 3 of the hydrogen-oxygen generator, which is in communication with the water circulation inlet 103 of the water tank 1 through the other one-way throttle valve 8, and the gas outlet 104 of the water tank 1 is in communication with the engine air-inlet 11 via the steam-water separator 9 and the dry flame arrester 10 in turn.

In the circuit, the water pump 4 and the electrolytic tank 3 of the hydrogen-oxygen generator are connected in parallel to the ends of the positive and negative electrodes of the vehicle power supply 12, respectively; the switch 6, the fuse 7 and the electrolytic tank 3 of the hydrogen-oxygen generator are connected in series to the vehicle power supply 12; with the working characteristic detection module 5 having five terminals in total, the first terminal 501 is connected to the negative electrode of the electrolytic tank of the hydrogen-oxygen generator, the second terminal 502 is connected to the negative electrode of the power supply, the third terminal 503 is connected to the positive electrode of the electrolytic tank of the hydrogen-oxygen generator, the fourth terminal 504 is suspended and not connected, and the fifth terminal 505 is connected to the positive electrode of the power supply.

A one-way throttle valve 8 is respectively arranged between the water circulation outlet 102 and the water pump 4, and between the electrolytic tank 3 of the hydrogen-oxygen generator and the water circulation inlet 103 to prevent gas-liquid backflow; besides, a steam-water separator 9 and a dry flame arrester 10 are arranged between the gas outlet 104 and the engine air-inlet, so as to dry the mixture gas and prevent backfire.

The electrolyte enters the water tank 1 through the liquid injection port 101, then flows out of the water tank 1 through the water circulation outlet 102 of the water tank 1, and then flows into the electrolytic tank 3 of the hydrogen-oxygen generator through the one-way throttle valve 8 under the action of the water pump 4; the generated hydrogen-oxygen mixture gas returns to the water tank 1 via the water circulation inlet 103 through another one-way throttle valve 8 along with the circulating flow of the electrolyte, then passes through the gas outlet 104, and then passes through the steam-water separator 9 and the dry flame arrester 10 in turn to enter the engine air-inlet 11.

The switch 6 and fuse 7 control and protect the electrolytic tank of the hydrogen-oxygen generator; the water pump 4 and the electrolytic tank 3 of the hydrogen-oxygen generator are connected in parallel to the vehicle power supply, working independently without interfering with each other; the working characteristic detection module 5 can monitor the voltage, current and other characteristics of the electrolytic tank 3 of the hydrogen-oxygen generator in real time.

As shown in FIGS. 5-8, the electrolytic tank of the hydrogen-oxygen generator is provided at the top and bottom with a cover plate, namely the upper cover plate 301 and the lower cover plate 302; the upper cover plate 301 is provided at the center of the lower surface with an upper circular groove 3015, and the lower cover plate 302 is provided at the center of the upper surface with a lower circular groove 3025, with a stainless steel sleeve 303 embedded between the upper circular groove 3015 and the lower circular groove 3025; the first limit bolt 308 penetrates the first upper through hole 3011 of the upper cover plate 301 and the first lower through hole 3021 of the lower cover plate 302; the second limit bolt 309 penetrates the second upper through hole 3012 of the upper cover plate 301 and the second lower through hole 3022 of the lower cover plate 302; the third limit bolt 310 penetrates the third upper through hole 3013 of the upper cover plate 301 and the third lower through hole 3023 of the lower cover plate 302; the fourth limit bolt 311 penetrates the fourth upper through hole 3014 of the upper cover plate 301 and the fourth lower through hole 3024 of the lower cover plate 302; and the first limit bolt 308, the second limit bolt 309, the third limit bolt 310 and the fourth limit bolt 311 are fastened with nuts at the bottom of the lower cover plate 302, so that the upper cover plate 301, the stainless steel sleeve 303 and the lower cover plate 302 form a sealed electrolytic chamber.

The sealed electrolytic chamber is provided inside with a stainless steel tube 312 as the cathode and a porous electrode rod 306 as the anode material. The porous electrode rod 306 has micron-scale three-dimensional pores in communication with each other, which is conducive to the mass transfer process and gas diffusion during electrolysis; besides, there are many nano-scale steps on the micron-scale pore wall; the pores of this micro-nano structure greatly increase the specific surface area of the electrode and expose more active sites, improving the thermodynamic and kinetic conditions in the electrolysis process, thereby effectively reducing the use of the electrode material. Therefore, in the present invention, the stainless steel tube 312 preferably has an inner diameter of 12-14 mm and an outer diameter of 14-16 mm; and the porous electrode rod 306 preferably has a diameter of 8-11.5 mm. The upper cover plate 301 is provided in the upper circular groove 3015 with an upper large groove 3016, which is provided inside with a threaded through hole 3017; a water inlet 3018 is arranged between the upper circular groove 3015 and the upper large groove 3016; the lower cover plate 302 is provided in the lower circular groove 3025 with a lower large groove 3026, which is provided inside with a small groove 3027, with a water outlet 3028 and a threaded through hole 3029 arranged between the lower circular groove 3025 and the lower large groove 3026; the porous electrode rod 306 has its top threaded through the threaded through hole 3017 of the upper cover plate 301, and its bottom embedded in the small groove 3027 of the lower cover plate 302, so as to get fastened; the stainless steel tube 312 is respectively embedded into the upper large groove 3016 of the upper cover plate 301 and the lower large groove 3026 of the lower cover plate 302, so as to get fastened; the stainless steel tube and the porous electrode rod are in close cooperation with each other in the electrolytic tank, and the distance between them is extremely small, which can effectively reduce the solution impedance and improve the electrolysis efficiency. The porous electrode rod 306 of the anode material passes through the threaded through hole 3017 and fits with the nut to serve as the positive electrode terminal of the electrolytic tank; a limit bolt 307 passes through a conductive plate 313 in connection with the stainless steel tube 312 of the cathode material, and then passes through the threaded through hole 3029 of the lower cover plate 302 to fit with a nut to serve as the negative electrode terminal of the electrolytic tank; the water inlet pipe joint 304 is embedded in the water inlet 3018 of the upper cover plate 301, and the water outlet pipe joint 305 is embedded in the water outlet 3028 of the lower cover plate 302. By optimizing the electrode material and electrolytic tank structure, the present invention reduces the volume and weight of the hydrogen-oxygen generator; the electrolyte flows through the water inlet 3018 into the compact sealed electrolytic chamber at a higher flow rate, which can accelerate the diffusion of substances in the sealed electrolytic chamber; the generated hydrogen-oxygen mixture gas quickly flows with the electrolyte out of the water outlet 3028, which can significantly reduce the concentration potential caused by the local pH change due to electrolysis; in addition, the accumulation of bubbles at active sites is avoided, which hinders the contact of electrolyte ions with the active sites, resulting in an increase in electric potential.

Examples for the Preparation of Porous Electrode Rods

Example 1

(1) Dissolving 7 parts by weight of $FeCl_3 \cdot 6H_2O$ and 3 parts by weight of $Na_2S_2O_8$ in 25 parts by weight of deionized water, and magnetically stirring at a rotating speed of 150 rpm for 5 min to obtain solution A;
(2) selecting the original iron-based alloy (containing 40% by mass of nickel, less than 0.03% by mass of S, and less than 0.03% by mass of P, provided by Wuxi Shenggang Superhard Material Co., Ltd.), and polishing its surface with 180 mesh SiC sandpaper for 5 min to remove the surface oxide scale;
(3) adding the polished iron-based alloy obtained in step (2) to solution A, and reacting for 4 h while magnetically stirring at a rotating speed of 100 rpm; and
(4) taking out the porous iron-based alloy after the reaction, then washing it with water and ethanol respectively for 3 times, then drying the porous iron-based alloy in an oven at 50° C. for 1 h, and finally taking it out to obtain the porous electrode rod.

Figure 9:
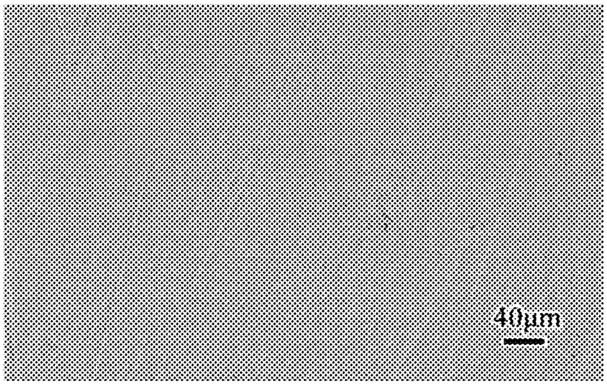
FIG. 9 shows a scanning electron micrograph of the original iron-based alloy in Example 1 for the preparation of porous electrodes.

The scanning electron micrograph of the original iron-based alloy was shown in FIG. 9, exhibiting a flat surface without pore structure.

Figure 10:
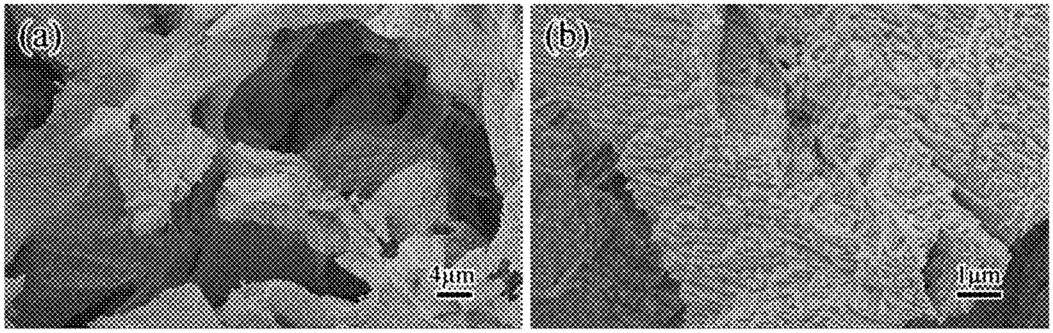
FIG. 10 shows a scanning electron micrograph of the porous iron-based alloy prepared in Example 1, in which (a) shows the electron micrograph with an magnification of 2,000 times, and (b) shows the electron micrograph with an magnification of 10,000 times.

The scanning electron micrograph of the iron-based alloy after the dealloying treatment was shown in FIG. 10. It can be seen in FIG. 10(*a*) at a magnification of 2,000 times that micron-scale three-dimensional pores in communication with each other (having a pore diameter of 10-20 μm) were formed on the surface of the alloy, conducive to the mass transfer process of the electrolyte and intermediates and the diffusion of the produced gas in the electrolysis process; it can be seen in FIG. 10(*b*) at a magnification of 10,000 times that many nano-scale steps were formed on the micron-scale pore wall; the pores of this micro-nano structure greatly increased the specific surface area of the electrode and exposed more active sites, improving the thermodynamic and kinetic conditions in the electrolysis process.

Figure 11:
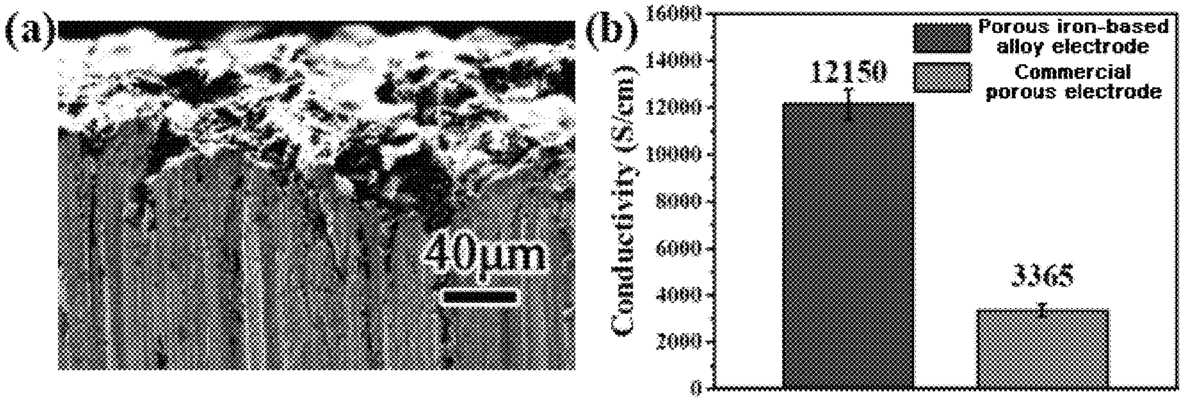
FIG. 11 shows the comparison of the scanning electron micrograph and electrical conductivity of the porous iron-based alloy prepared in Example 1, in which (a) is an electron micrograph of a cross section, and (b) shows the comparison of electrical conductivity between the porous iron-based alloy electrode and a commercial porous electrode.

The scanning electron micrograph of the cross section of the iron-based alloy after the dealloying treatment was shown in FIG. 11(*a*), exhibiting that the porous iron-based alloy electrode had a porous surface and a dense core; the dense core could provide a fast electron transfer channel for the porous layer on the surface and improve the electrical conductivity of the porous iron-based alloy electrode; as shown in FIG. 11.(*b*), the electrical conductivity of the porous iron-based alloy electrode was significantly higher than that of the commercial porous electrode, which could effectively reduce the contact impedance of the hydrogen-oxygen generator.

Figure 12:
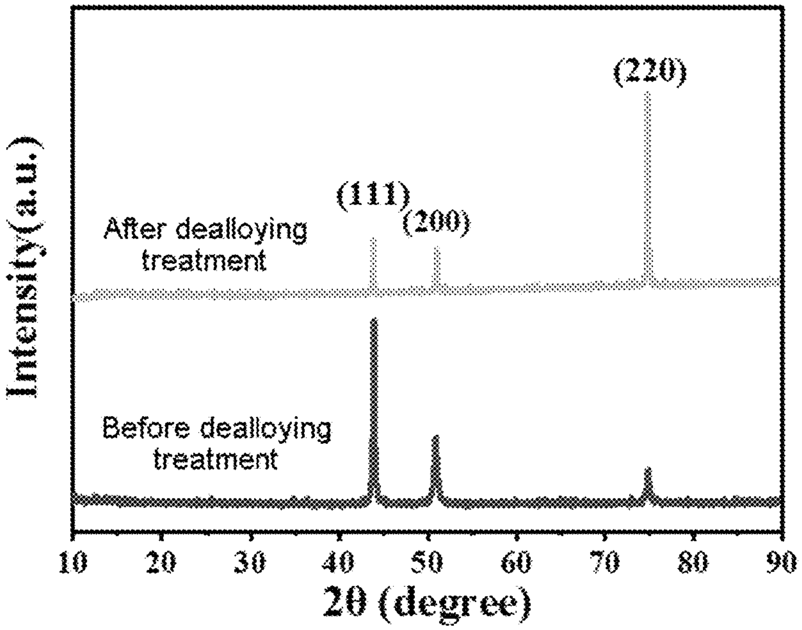
FIG. 12 shows an XRD diffraction pattern of the iron-based alloy in Example 1 before and after the dealloying treatment.
Figure 13:
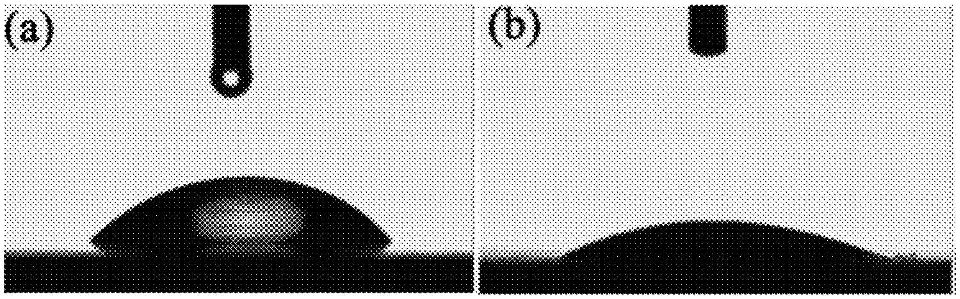
FIG. 13 shows a photo of the wetting angle of the iron-based alloy in Example 1 before and after the dealloying treatment, in which (a) shows the photo of the wetting angle before the dealloying treatment, and (b) shows the photo of the wetting angle after the dealloying treatment.

The XRD diffraction pattern of the iron-based alloy after the dealloying treatment was shown in FIG. 12; the strongest diffraction peak moved from the (111) plane before the dealloying treatment to the (220) plane after the dealloying treatment, and the exposed (220) plane was a non-closely packed plane and had the characteristics of high surface energy; in addition, the unique micro-nano pore structure of the surface of the alloy destroyed the gas-liquid-solid three-phase contact line, which could significantly enhance the hydrophilic and gas-repellent properties of the electrode. As shown in FIG. 13, the contact angle of the iron-based alloy before and after the dealloying treatment was reduced from 50.8° to 24.5°, such that the porous surface of the iron-based alloy could better achieve wetting contact with the electrolyte, the active sites on the surface could be fully utilized, and the gas generated by the reaction could be more easily dissipated. Therefore, the mass transfer process and gas diffusion during electrolysis could be promoted while the compact design of the hydrogen-oxygen generator was realized, improving the electrolysis efficiency.

With a three-electrode system adopted, the porous iron-based alloy prepared in this example, the original iron-based alloy, and the austenitic stainless steel were respectively used as the working electrode, the platinum sheet was used as the counter electrode, and the Hg/HgO electrode was used as the reference electrode; the electrochemical test was performed on the Gamry electrochemical workstation to characterize the electrolytic-water catalytic performance of the porous iron-based alloy, taking the specific test parameters as follows: using the linear sweep voltammetry, with the scanning speed at 5 mV/s and the scanning voltage at 0.2-0.7 V (vs. Hg/HgO); after the test, the voltage was converted into the electrode potential relative to the reversible hydrogen electrode according to the conversion formula, $E_{RHE}=E_{Hg/HgO}+0.059*pH+0.098$.

Figure 14:
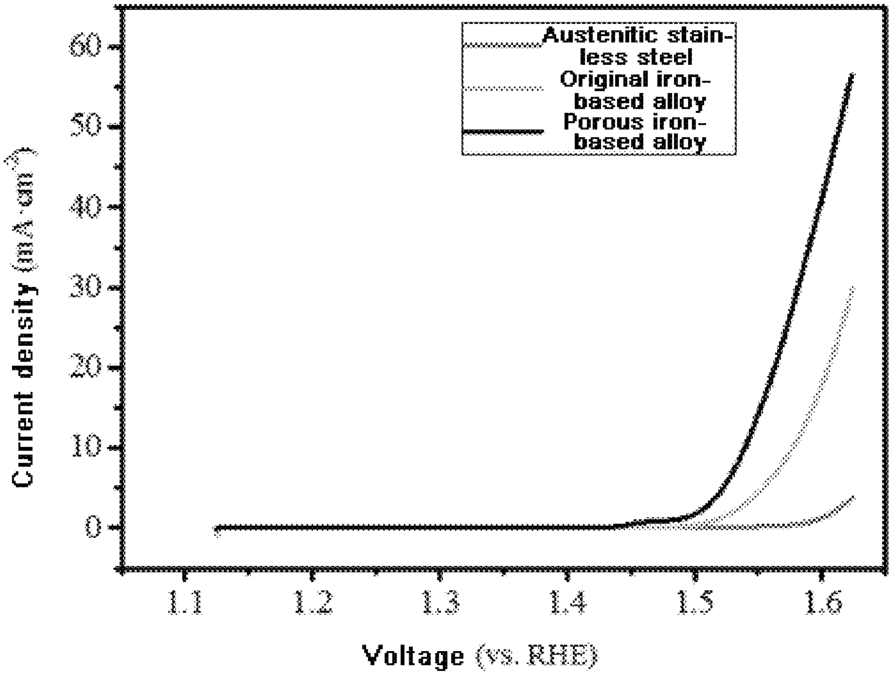
FIG. 14 shows a polarization curve of the porous iron-based alloy, the original iron-based alloy, and the austenitic stainless steel in Example 1 for the preparation of porous electrodes.
Figure 15:
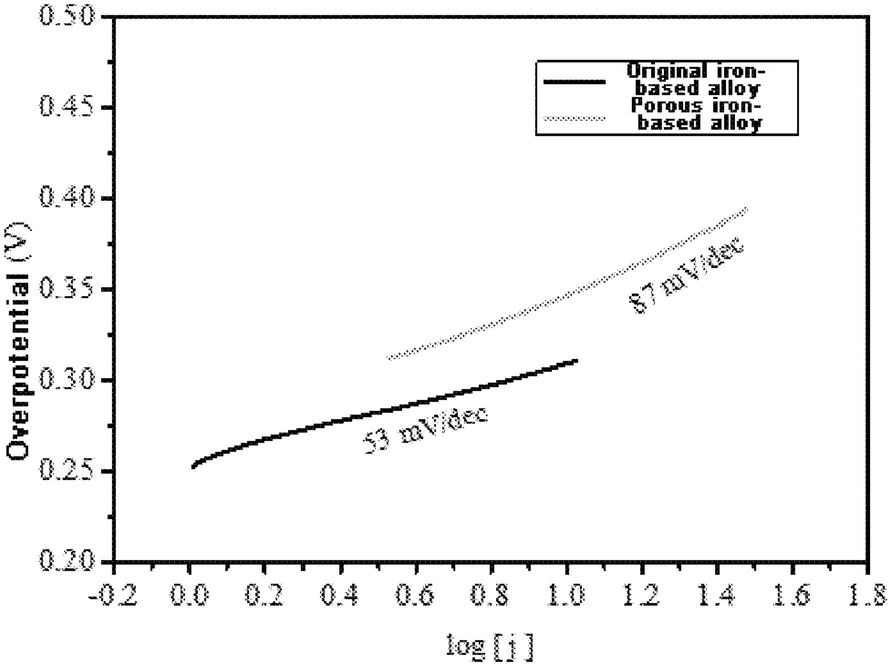
FIG. 15 is a diagram showing the Tafel slope of the porous iron-based alloy and the original iron-based alloy in Example 1 for the preparation of porous electrodes.

It can be seen from FIG. 14 that the present invention used the iron-based alloy as the electrode material, whose electrochemical performance was far superior to that of the traditional austenitic stainless steel. It can be seen from FIGS. 14 and 15 that after the iron-based alloy was dealloyed to form a porous structure, the overpotential at 10 $mA\cdot cm^{-2}$ dropped from 346 mV to 309 mV, and the Tafel slope dropped from 87 mV/dec to 53 mV/dec, indicating that the thermodynamic and kinetic conditions in the electrolysis process had been improved, and the electrochemical performance had been further improved. Therefore, using the porous iron-based alloy as the porous electrode material of the hydrogen-oxygen generator effectively improved the electrolysis efficiency, reducing the use of electrode material on the premise of ensuring the gas production; on this basis, the structure of the electrolytic tank of the hydrogen-oxygen generator was optimized, so that the volume and weight of the device were reduced. The volume and weight of the electrolytic tank of the hydrogen-oxygen generator prepared in this example did not exceed 0.2 L and 0.5 kg, respectively, and the electrolytic tank per unit volume could produce at least 1.875 L of the mixture gas per minute.

Example 2

(1) Dissolving 5 parts by weight of $FeCl_3\cdot 6H_2O$ and 4 parts by weight of $Na_2S_2O_8$ in 25 parts by weight of deionized water, and magnetically stirring at a rotating speed of 50 rpm for 10 min to obtain solution A;

(2) selecting the iron-based alloy (containing 40% by mass of nickel, less than 0.03% by mass of S, and less than 0.03% by mass of P, provided by Wuxi Shenggang Superhard Material Co., Ltd.), and polishing its surface with 360 mesh SiC sandpaper for 15 min to remove the surface oxide scale;

(3) adding the polished iron-based alloy obtained in step (2) to solution A, and reacting for 2 h while magnetically stirring at a rotating speed of 150 rpm; and (4) taking out the porous iron-based alloy after the reaction, then washing it with water and ethanol respectively for 3 times, then drying the porous iron-based alloy in an oven at 80° C. for 0.5 h, and finally taking it out to obtain the porous electrode rod for the device.

Figure 16:
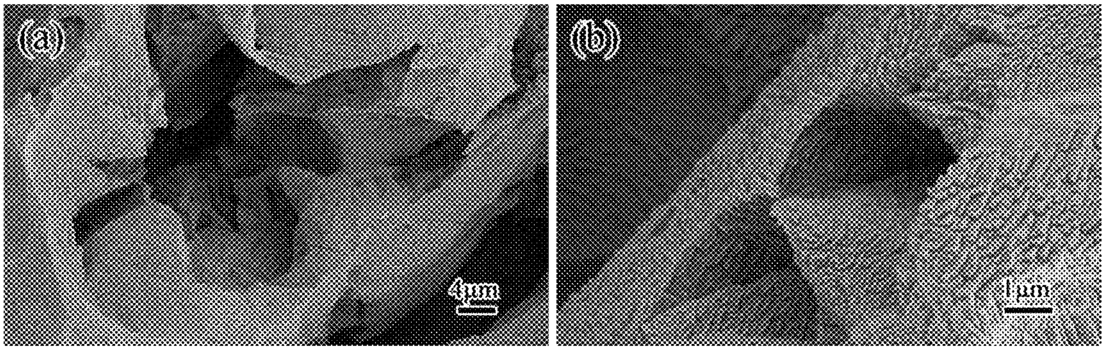
FIG. 16 shows a scanning electron micrograph of the porous iron-based alloy prepared through the dealloying treatment with the $FeCl_3$+$Na_2S_2O_8$ solution in Example 2 for the preparation of porous electrodes, in which (a) shows the electron micrograph with an magnification of 2,000 times, and (b) shows the electron micrograph with an magnification of 10,000 times.

The scanning electron micrograph of the iron-based alloy after the dealloying treatment was shown in FIG. 16. It can be seen in FIG. 16(*a*) at a magnification of 2,000 times that the micron-scale three-dimensional pores in communication with each other (having a pore diameter of 10-20 μm) were still formed on the surface of the alloy; it can be seen in FIG. 16(*b*) at a magnification of 10,000 times that many nano-scale steps were formed on the micron-scale pore wall; the three-dimensional communicated micro-nano pores could effectively improve the thermodynamic and kinetic conditions in the electrolysis process, and reduce the overpotential and Tafel slope of the oxygen evolution reaction, with the corresponding test results similar to Example 1.

Example 3

(1) Dissolving 6 parts by weight of $FeCl_3\cdot 6H_2O$ and 3 parts by weight of $Na_2S_2O_8$ in 25 parts by weight of deionized water, and magnetically stirring at a rotating speed of 100 rpm for 8 min to obtain solution A;

(2) selecting the iron-based alloy (containing 40% by mass of nickel, less than 0.03% by mass of S, and less than 0.03% by mass of P, provided by Wuxi Shenggang Superhard Material Co., Ltd.), and polishing its surface with 270 mesh SiC sandpaper for 10 min to remove the surface oxide scale;

(3) adding the polished iron-based alloy obtained in step (2) to solution A, and reacting for 12 h while magnetically stirring at a rotating speed of 150 rpm; and (4) taking out the porous iron-based alloy after the reaction, then washing it with water and ethanol respectively for 3 times, then drying the porous iron-based alloy in an oven at 40° C. for 2 h, and finally taking it out to obtain the porous electrode rod for the device.

Figure 17:
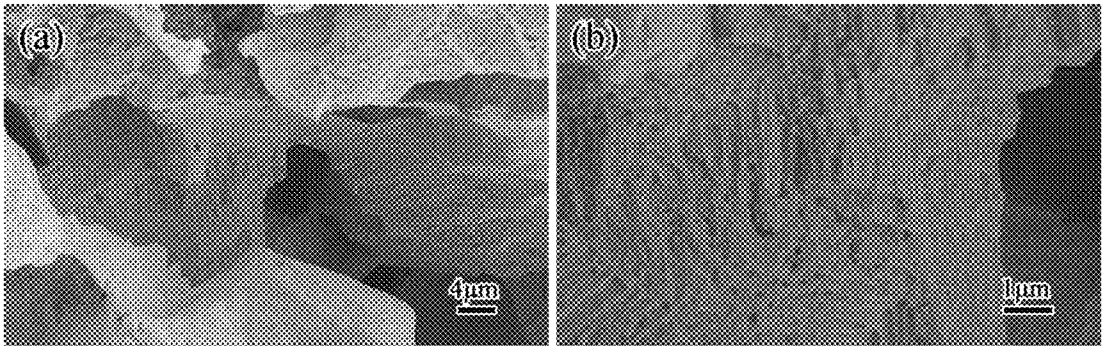
FIG. 17 shows a scanning electron micrograph of the porous iron-based alloy prepared through the dealloying treatment with the $FeCl_3$+$Na_2S_2O_8$ solution in Example 3 for the preparation of porous electrodes, in which (a) shows the electron micrograph with an magnification of 2,000 times, and (b) shows the electron micrograph with an magnification of 10,000 times.

The scanning electron micrograph of the iron-based alloy after the dealloying treatment was shown in FIG. 17. It can be seen in FIG. 17(*a*) at a magnification of 2,000 times that the micron-scale three-dimensional pores in communication with each other (having a pore diameter of 10-20 μm) were still formed on the surface of the alloy; it can be seen in FIG. 17(*b*) at a magnification of 10,000 times that the nano-scale steps were formed on the micron-scale pore wall; the three-dimensional communicated micro-nano pores could effectively improve the thermodynamic and kinetic conditions in the electrolysis process, and reduce the overpotential and Tafel slope of the oxygen evolution reaction, with the corresponding test results similar to Example 1.

The invention claimed is:

1. A compact vehicle-mounted hydrogen-oxygen generator, comprising a box, a water tank, an electrolytic tank of the hydrogen-oxygen generator, a water pump, a working characteristic detection module, a fuse, a switch, a steam-water separator, a dry flame arrester and two one-way throttle valves, characterized in that:

the water tank is provided on the top with a liquid injection port, and on the side with a water circulation outlet, a water circulation inlet and a gas outlet;

in a fluid path, the water circulation outlet of the water tank is in communication via one of the two one-way throttle valves with the water pump, which is in communication with the electrolytic tank of the hydrogen-oxygen generator, which is in communication with the water circulation inlet of the water tank through the other one-way throttle valve, and the gas outlet of the water tank is in communication with an engine air-inlet via the steam-water separator and the dry flame arrester in turn;

the water pump and the electrolytic tank of the hydrogen-oxygen generator are electronically connected in parallel to a positive electrode and a negative electrodes of a power supply of a vehicle, respectively; the switch, the fuse and the electrolytic tank of the hydrogen-oxygen generator are connected in series to the vehicle power supply; with the working characteristic detection module having five terminals in total, the first terminal is connected to a negative electrode of the electrolytic tank of the hydrogen-oxygen generator, the second terminal is connected to the negative electrode of the power supply, the third terminal is connected to a positive electrode of the electrolytic tank of the hydrogen-oxygen generator, the fourth terminal is suspended and not connected, and the fifth terminal is connected to the positive electrode of the power supply;

in the electrolytic tank of the hydrogen-oxygen generator, a sealed electrolytic chamber is formed by an upper cover plate, a stainless steel sleeve and a lower cover plate, and is provided inside with a stainless steel tube as a cathode and a porous electrode rod as an anode; the porous electrode rod passes through the upper cover plate to serve as a positive electrode terminal, and a limit bolt connected to the stainless steel tube passes through the lower cover plate to serve as a negative electrode terminal; the upper cover plate and the lower cover plate are respectively provided with a water inlet and a water outlet to connect to the sealed electrolytic chamber;

the porous electrode rod is prepared through the following steps:

1) dissolving $FeCl_3 \cdot 6H_2O$ and $Na_2S_2O_8$ in deionized water, and stirring to obtain solution A;

2) selecting iron-based alloy containing 40% to 60% by mass of nickel, less than 0.03% by mass of S, and less than 0.03% by mass of P, with iron for the balance), and fully polishing its surface to remove the surface oxide scale;

3) adding the polished iron-based alloy obtained in step 2) to solution A, and reacting while stirring; and 4) taking out the iron-based alloy after the reaction, and washing and drying it.

2. The compact vehicle-mounted hydrogen-oxygen generator according to claim 1, characterized in that: the diameter of the anode porous electrode rod is 8-11.5 mm.

3. The compact vehicle-mounted hydrogen-oxygen generator according to claim 1, characterized in that: the stainless steel tube is a 304 stainless steel tube with an inner diameter of 12-14 mm and an outer diameter of 14-16 mm.

4. The compact vehicle-mounted hydrogen-oxygen generator according to claim 1, characterized in that: in step 1), the mass ratio of $Na_2S_2O_8$, $FeCl_3 \cdot 6H_2O$ and water is (2 to 4): (5 to 7): 25, and the stirring is done magnetically at a rotating speed of 50-150 rpm for 5-10 min.

5. The compact vehicle-mounted hydrogen-oxygen generator according to claim 1, characterized in that: 180-360 mesh SiC sandpaper is used for polishing in step 2), with the polishing time of 5-15 min.

6. The compact vehicle-mounted hydrogen-oxygen generator according to claim 1, characterized in that: the stirring in step 3) is done magnetically at a rotating speed of 50-150 rpm for 2-12 h; and in step 4), the washing is done by washing with water and ethanol for 3-5 times, respectively, and the drying is done by drying in an oven for 0.5-2 h at the temperature of 40° C. to 80° C.

7. The compact vehicle-mounted hydrogen-oxygen generator according to claim 1, characterized in that: the upper cover plate is provided at the center of the lower surface with an upper circular groove, and the lower cover plate is provided at the center of the upper surface with a lower circular groove, with a stainless steel sleeve embedded between the upper circular groove and the lower circular groove; the porous electrode rod has its top threaded through a threaded through hole of the upper cover plate, and its bottom embedded in a small groove of the lower cover plate, so as to get fastened; the stainless steel tube is respectively embedded into an upper large groove of the upper cover plate and a lower large groove of the lower cover plate, so as to get fastened.

8. The compact vehicle-mounted hydrogen-oxygen generator according to claim 1, characterized in that: the upper cover plate is provided in an upper circular groove with an upper large groove, which is provided inside with a threaded through hole; a water inlet is arranged between the upper circular groove and the upper large groove; the lower cover plate is provided in a lower circular groove with a lower large groove, which is provided inside with a small groove, with a water outlet and a threaded through hole arranged between the lower circular groove and the lower large groove; the porous electrode rod has its top threaded through the threaded through hole of the upper cover plate, and its bottom embedded in the small groove of the lower cover plate, so as to get fastened; the stainless steel tube is respectively embedded into the upper large groove of the upper cover plate and the lower large groove of the lower cover plate, so as to get fastened; the limit bolt passes through a conductive plate in connection with the stainless steel tube of the cathode material, and then passes through the threaded through hole of the lower cover plate to fit with a nut to serve as the negative electrode terminal of the electrolytic tank; a water inlet pipe joint is embedded in the water inlet of the upper cover plate, and a water outlet pipe joint is embedded in the water outlet of the lower cover plate.

9. The compact vehicle-mounted hydrogen-oxygen generator according to claim 1, characterized in that: an electrolyte (0.03-0.5 M caustic potassium solution) flows into the compact sealed electrolytic chamber through the water inlet, and the generated hydrogen-oxygen mixture gas quickly flows out of the water outlet together with the electrolyte.

10. The compact vehicle-mounted hydrogen-oxygen generator according to claim 1, characterized in that: the upper cover plate and the lower cover plate are fastened through four limit bolts.

* * * * *